| United States Patent [19] | [11] Patent Number: 4,880,104 |
|---|---|
| Evans et al. | [45] Date of Patent: Nov. 14, 1989 |

[54] LANE ADJUSTING APPARATUS FOR BOTTLE GUIDES

[75] Inventors: Neil L. Evans, Fox Lake; Aldo L. Tombolato, DesPlaines; Robert R. Reynolds, Lake Zurich; Robert J. Meisner, Hinsdale, all of Ill.

[73] Assignee: Kraft, Inc., Glenview, Ill.

[21] Appl. No.: 105,100

[22] Filed: Oct. 5, 1987

[51] Int. Cl.$^4$ ............................................. B65G 47/12
[52] U.S. Cl. ..................................... 198/445; 198/836
[58] Field of Search ............... 198/427, 445, 446, 458, 198/836; 53/537, 543

[56] References Cited

U.S. PATENT DOCUMENTS

| 738,749 | 9/1903 | Alfred | 198/446 |
|---|---|---|---|
| 1,325,505 | 12/1919 | Bong . | |
| 2,951,574 | 9/1960 | Craig | 198/836 |
| 3,289,867 | 7/1965 | Burke . | |
| 3,554,353 | 1/1971 | Ravdat | 198/836 |
| 3,767,027 | 10/1973 | Pund et al. . | |
| 3,860,232 | 1/1975 | Martin . | |
| 3,986,598 | 10/1976 | Grantham . | |
| 4,432,189 | 2/1984 | Raudat . | |
| 4,446,672 | 5/1984 | Raudat . | |
| 4,536,118 | 8/1985 | Baba . | |
| 4,552,349 | 11/1985 | Loos et al. . | |

FOREIGN PATENT DOCUMENTS

57812   4/1984   Japan .................................. 198/458

Primary Examiner—Joseph E. Valenza
Attorney, Agent, or Firm—Fitch, Even, Tabin & Flannery

[57] ABSTRACT

Automatically adjustable lane guide and grid packing systems which provide for automated accommodation of articles of different size in controlling the transport of rows of moving articles.

10 Claims, 6 Drawing Sheets

LANE ADJUSTING APPARATUS FOR BOTTLE GUIDES

BACKGROUND OF THE INVENTION

This invention relates to adjustable systems for controlling the transport of rows of moving articles. More particularly, the invention is directed to adjustable guide and transport systems, such as lane guide and grid packing apparatus for transferring a plurality of rows of articles such as filled or unfilled product containers, which systems may be readily adjusted to process articles of different size.

In the manufacture and handling of large quantities of articles of uniform size such as product containers, barbecue sauce or pourable dressing bottles, the articles are conventionally conveyed automatically through various processing operations such as provided by product filling apparatus, as well as container capping, labeling and packing systems. The product containers or other articles are conventionally transported in a uniform and stable handling position, on a moving belt or conveyor in a plurality of rows established by lane guide assemblies. The lane guide assemblies form lanes generally having a width only slightly larger than the maximum article width, for the article width dimension perpendicular to product flow at the point of lane guide support.

Upon completion of the manufacturing or processing steps, the lane-guided rows of articles, such as filled, capped and labeled food product containers, may be conventionally transported to a grid packing assembly which selects and packs a two-dimensional array of the articles in a suitable square or rectangular-celled carton or other container for storage, handling and shipment.

The lane guides are conventionally provided in the form of vertically oriented guide plates which are supported at predetermined support locations along horizontal supports rods. When it is necessary to change the lane width, to adjust the lane guide assembly for proper product flow, or to convert the lane guide assembly for use with a different sized product, the lane guide supporting fasteners are typically loosened or disassembled with each of the lane guides subsequently being manually positioned to accommodate the desired product width along the respective lanes, and the support assemblies subsequently being reassembled. Similarly, conventional grid packing assemblies are constructed to accommodate only a single product dimension, or a relatively narrow range of product dimensions. It would be desirable to provide an adjustable grid packer system which could accommodate and package a wide range of product sizes. It would also be desirable to provide a unified lane guide processing and packaging system comprising a lane guided transport system and a grid packing system which is adjustable to accommodate the manufacture and packaging of articles of different shape or size.

These and other objects of the invention will be more readily understood from the following description and the accompanying drawings.

DESCRIPTION OF THE INVENTION

The present invention is directed to methods and apparatus for controlling the transport of rows of moving articles which may be adjusted to accommodate articles which may be of different size. The invention is particularly directed to adjustable lane guide and grid packing systems which are readily adjustable to be capable of operation with a variety of products of different physical dimension.

Various aspects of the invention are directed to an adjustable lane guide mechanism comprising a plurality of lane guides each having at least one support zone having a passageway and a rotatable shaft positioned in the passageway of each of said lane guides. The lane guides will typically be in parallel array, forming a plurality of product lanes therebetween to guide product transport. The distance between the lane guides, corresponding to the width of the product transport lanes, will desirably be only slightly larger than the product width perpendicular to its desired direction of transport. The lane guides and product lanes defined therebetween may be linear or curved to effect the desired transport direction in the product transport flow. A plurality of stationary internally threaded telescoping elements are positioned on the respective lane guides. One or two of such stationery telescoping elements may be positioned on each respective lane guide at the respective support zone. When two telescoping stationery elements are positioned at each lane guide support zone, at least one lane guide adjacent thereto may be provided without such a telescoping stationary element. Alternatively, stationery telescoping elements may be positioned on opposite sides of a lane guide, so that such elements need not be positioned on adjacent lane guides. Upon rotation of the rotatable shaft, the distance between the lane guides may be expanded or compressed to respectively widen or narrow the product lanes defined by the lane guides. As also indicated, the present invention is also directed to grid packing systems which may include a plurality of stacked lane guide arrays adjusted to expand and contract in directions having an orthogonal component for packaging placement of products of varying size.

Another aspect of the present invention is directed to adjustable grid packing systems which utilize generally orthogonal arrays of adjustable lane guide apparatus to accommodate a range of product sizes. Various embodiments of such adjustable grid packing systems will comprise an upper adjustable lane guide assembly comprising a plurality of upper layer lane guides. These lane guides desirably comprise or are extensions of an adjustable, conveying lane guide system of the type previously described. The upper adjustable lane guide assembly will further comprise upper lane guide rotational adjustment and support means for supporting the upper layer lane guides at a predetermined separation distance determined by the rotational position of at least one threaded, axially telescoping adjustment mechanism separating and supporting the upper layer lane guides. The grid packing apparatus may further comprise a lower, bidirectionally adjustable lane grid assembly comprising a first plurality of lower lane grid elements parallel to and aligned with the upper layer lane guides and a second plurality of lane guide grid elements oriented generally orthogonally to the first plurality of lane guide grid elements. The lane grid assembly will further comprise first lane grid rotational adjustment and support means for supporting the first plurality of lane grid elements at a predetermined separation distance determined by the rotational position of at least one threaded, axially telescoping adjustment element separating and supporting the first plurality of lane grid elements and second lane grid rotational adjustment and support means for supporting the second plurality of lane grid elements at a predetermined separation distance determined by the rotational position of at least one threaded, axially telescoping adjustment mechanism separating and supporting the second plurality of lane grid elements. The adjustable grid packing apparatus may further comprise an adjustable, shifting support array of support elements positioned intermediate the upper lane guide assembly and the lower grid assembly for supporting articles between the upper layer lane guide elements. The adjustable support array may further comprise shifting support rotational adjustment and support means for supporting the support elements at a predetermined separation distance determined by the rotational position of at least one threaded, axially telescoping adjustment element separating and supporting the support elements. The grid packing apparatus desirably further comprises means for shifting the adjustable support array with respect to the upper lane guide array to remove support for articles positioned between the upper lane guide elements. The grid shifting means will preferably shift the support array with respect to the upper lane guide assembly and the lower lane guide assembly, but such means may also shift the latter component with respect to the support array.

Figure 1:
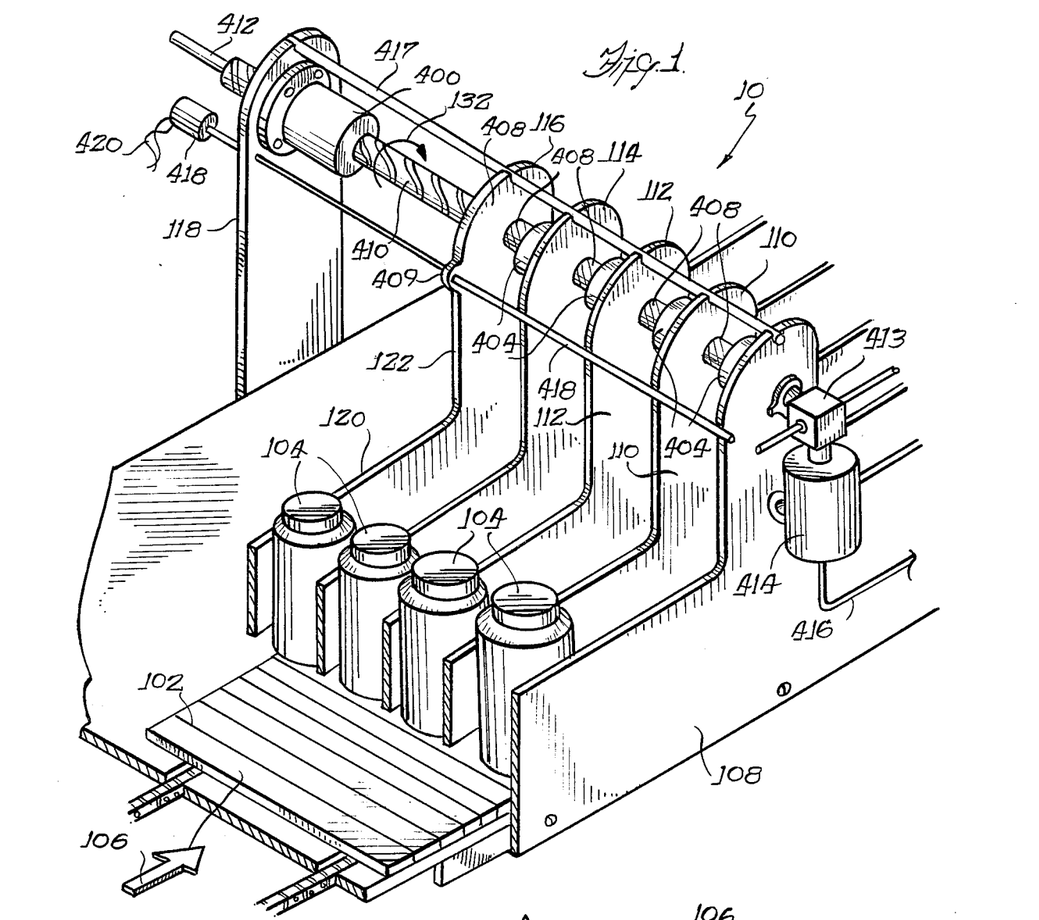
FIG. 1 is a perspective view of an embodiment of an adjustable lane guide system in accordance with the present invention.

The invention will now be more particularly described with respect to the embodiment illustrated in FIG. 1. FIG. 1 is a perspective view of a portion of an embodiment 10 of an adjustable lane guide system in accordance with the present invention. In the illustrated embodiment, a moving conveyor 102 transports a plurality of articles, here shown as product containers 104 in the general direction of the arrow 106 within lanes defined by lane guides 108, 110, 112, 114, 116, which may be fabricated from a suitable material such as stainless steel. The end guide 108 in the illustrated embodiment 10 is stationary and is firmly supported by attachment to a stationary edge support of the conveyor mechanism. However, it will be appreciated that one of the interior guides could similarly be a stationery guide, with mobile guides adjacent both sides thereof. The intermediate lane guide components 110, 112, 114, 116 are movable, as will be described in more detail hereinafter. A second stationary support 118 is provided distally of the other end support 108. As shown in FIG. 1, the stationary lane guide 108 and the adjustable lane guide elements 110, 112, 114, 116 generally comprise extending horizontal segments 120, and upstanding support segments 122, which function to support the adjustable lane guide elements at a selected position, and to interact with the width adjustment system 400 which will be described in more detail with respect to FIG. 4. The upstanding support portions 122 of the lane guide elements are displaced sufficiently from the surface of the conveyor belt 102 that the width adjustment mechanism 400 does not interfere with the passage of the containers 104 along the lanes defined by the lane guides. It will be appreciated that each of the lane guides 108, 110, 112, 114 and 116 extends along the conveyor mechanism and is provided with one or more additional upstanding support projections, like projections 122, with additional support elements 118 and adjustment systems 400 being provided to support the lane guide system along the desired article pathway.

Figure 2:
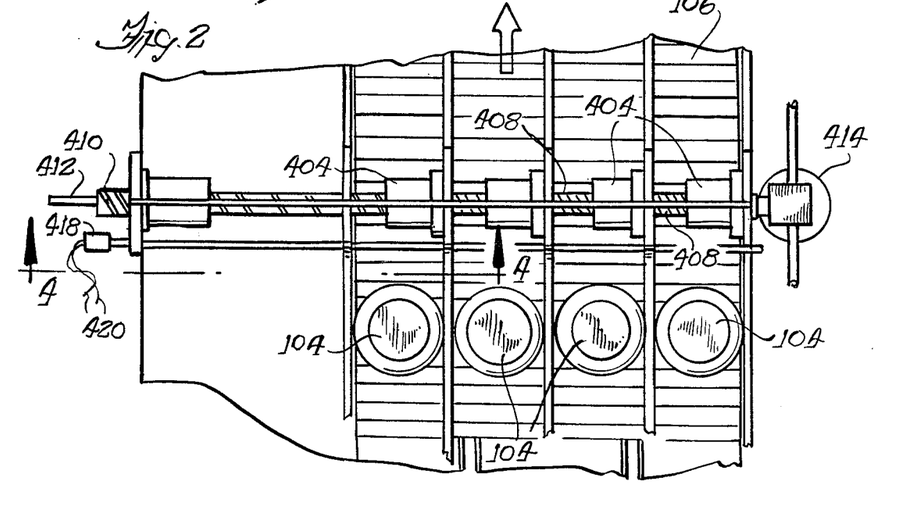
FIG. 2 is a plan view of one of the adjustable guide assemblies of the lane guide system of FIG. 1.

The lane guide width adjustment and support mechanism 400 is an important part of the illustrated adjustable lane guide embodiment 10. As shown in FIGS. 1 and 2, the lane guide width adjustment system 400 comprises a plurality of internally threaded telescoping elements 404, 406, intermediate telescoping externally threaded spacer elements 408, 410, a rotatable shaft 412, and a computer-controlled drive motor 414 for the shaft 412. A gear assembly 413 connects the motor 414 to the shaft 412. Desirably, the drive motor 414 may be a digitally position controlled motor suitable for precision adjustment. A spreader bar 417 which is affixed to the immobile end support elements 108, 118, but which is slidingly engageable with the mobile lane guide elements 110, 112, 114, 116, may be used to stabilize the structure and prevent spreading of the elements upon operation of the drive motor if the end supports 108, 118 are of limited rigidity.

As indicated in FIG. 1, the motor may drive multiple shafts connecting to suitable gear assembly elements 413 like that of FIG. 1, which may in turn be utilized to adjust the width of the lane grid elements at multiple positions along the conveyor through the use of a single drive motor. The illustrated lane width adjustment and support system 400 further includes a linear position control sensor 418 having electrical power and control signal wires 420. The position control sensor may be of conventional design (such as Model DCTM of Temposonics) which, for example, senses the position of a magnetic element 409 affixed to lane guide 122, along the sensor wand and hence the distance between the fixed bases of the sensor at fixed lane guide 108 and the distal lane guide 120.

Figure 3:
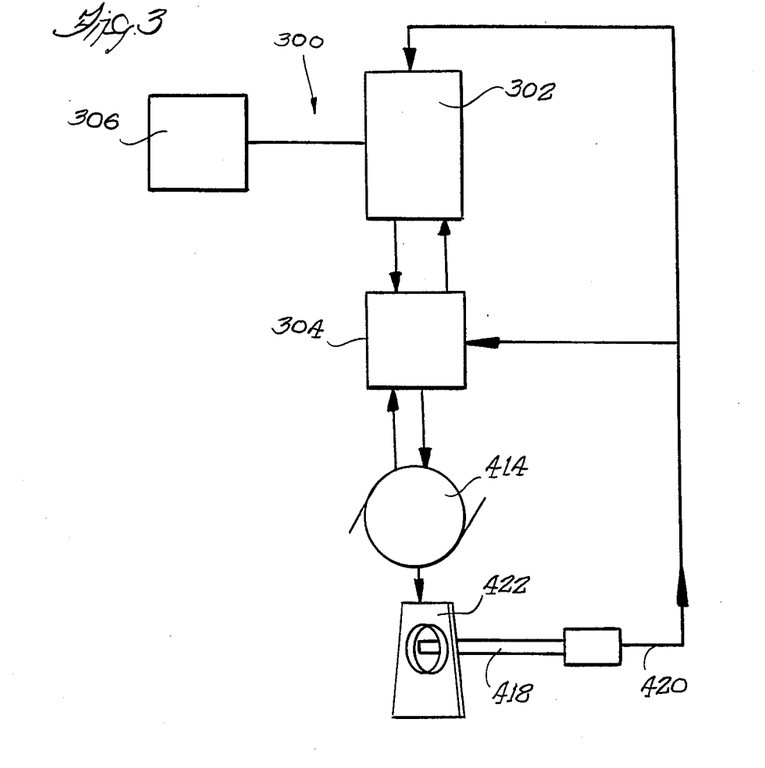
FIG. 3 is a schematic diagram of an embodiment of the adjustable lane guide control system including the linear transducer positioning circuitry for controlling the positioning of the lane guide system of FIG. 1.

Illustrated in FIG. 3 is a schematic diagram of an embodiment of the adjustable lane guide control system including transducer positioning circuitry for controlling the positioning of the lane guide system of FIG. 1. As shown in FIG. 3, the positioning control system 30 comprises a programmable logic controller 302, which is utilized to control the positioning of the entire lane guide array, including a plurality of width adjusting mechanisms such as shown in FIG. 1 along the lane guide system. For each lane guide width control mechanism, the system 300 may include a slave controller 304, the reversing motor driving mechanical positioner 414 for the respective positioning mechanism, the linear displacement transducer 418 and sensing element 422 for the transducer. Alternatively, the motor control function may be carried out directly by a programmable controller 302 without intermediate slave controllers. The system 300 may further include an operator station or "teaching pendant" 306 in accordance with conventional practice in linear position feedback control. The position data provided by the linear displacement transducer 418 and sensor element 422, which provides a measurement of the total width of the lanes and lane guides from the stationary end guide 108, provides input data to both the slave controller 304 and the programmable logic controller 302. Set width positions for processing of each of a plurality of different products may be respectively stored in the programmable logic controller, and this width data may be downloaded as shown in FIG. 3 to the slave controller to direct adjustment of the entire lane guide array to predetermined width positions controlled by the downloaded data. The slave controller 304 in turn operates to control the driving mechanical positioner 414 so that the actual measured width determined by the linear displacement transducer 418 and sensor 422 corresponds to the predetermined data point width setting. The programmable controller 302, slave controllers 304 and operator stations 306 may be conventional process control equipment such as a Barber-Colman Model 560 slave control used with electronic actuator drive to provide control of an electric gear train actuator from a variable d.c. signal, and Model 520C programmable controller manufactured by Texas Instruments. The operator station may be any suitable station such as those utilized with conventional pilot devices. As indicated, a plurality of width adjustment settings for different products may be stored in the programmable logic controller. In this regard, these width settings may be introduced numerically at the operator station 306, or may be stored by use of a "teaching pendant". The data may also be provided by mechanically adjusting the system to operate properly for a given product, and storing the system condition for such operation so that this positioning may be restored when desired under control of the programmable logic controller 302 and the slave controller 304 for each width adjustment mechanism along the lane guide system. Alternatively, the width positioning may be carried out manually by providing means for manually rotating the shaft 412. For such manual systems, which may be positioned by direct width measurement of the lane spacing, or by alignment of preset markings, the automatic motor controls and/or positioning sensors are not utilized. When it is desired to utilize the lane guide transport system with another product of different width, the system 300 may be utilized to rapidly and automatically adjust the lane guides for such operation by downloading the desired lane guide width data to the respective slave controllers 304, as previously described. This lane guide adjustment may be carried out over an entire packaging line or product transport line by a single operator command in a very short period of time.

Figure 4:
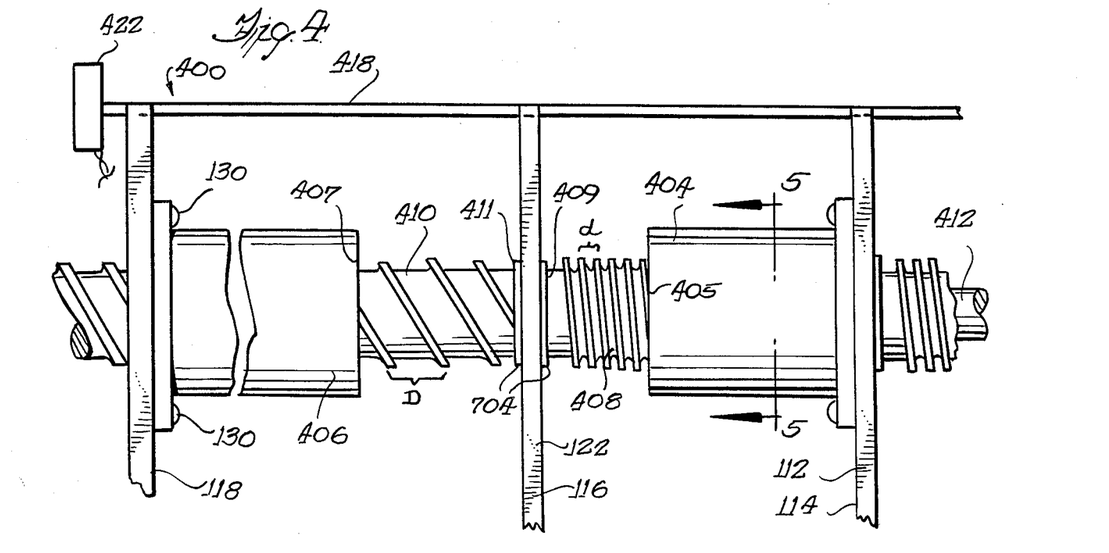
FIG. 4 is a side elevation of a portion of one of the bushing assemblies of the adjustable lane guide system of FIG. 1 taken along line 4—4 of FIG. 2.

As indicated, the adjustable support mechanism 400 is an important part of the lane guide embodiment 10 illustrated in FIG. 1. FIG. 4 is a side elevation of a portion of one of the bushing assemblies of the adjustable lane guide system of FIG. 1, taken along line 4—4 of FIG. 2, which illustrate an embodiment of the adjustable support mechanism, which may be fabricated from a suitable material such as stainless steel, brass or bronze. The lane guide adjustment system 400 comprises an internally threaded telescoping element 406 of coarse thread pitch which is irrotatably mounted on fixed lane guide support element 118 by means of screws 130. The threads are desirably of Acme or square cross section to provide for smooth axial thrust upon telescoping rotation with the corresponding externally threaded element. In the illustrated embodiment 400, the threads of the element 406 have a pitch of $2\frac{1}{2}$ threads/inch, a depth of 0.205" and a width of 0.148" ($1\frac{1}{2}\times2\frac{1}{2}$ Acme Thd, Class 4G). The apparatus 400 further comprises a plurality of internally threaded telescoping elements of finer thread 404 which are respectively irrotatably mounted on the upstanding support projections 122 of movable lane guide elements 114, 112 (FIG. 1) and 110 (FIG. 1), as well as the fixed lane guide support element 108. Like the coarsely threaded element 406, the finer threads of elements 404 are also desirably of Acme or square cross section to provide for smooth axial thrust upon telescoping rotation with the corresponding threaded element. The internal thread pitch of the finer threaded telescoping elements 404 of the illustrated embodiment 400 is an integral multiple of the thread pitch of the telescoping element 406. By thread pitch is meant the number of threads per unit length. Typically, the element 404 may have a threaded pitch of about 10 threads per inch. The mechanical width adjustment mechanism 400 further includes an externally threaded element 410 which rotationally telescopically engages the internally threaded element 406 such that upon clockwise rotation of the externally threaded element 410 (as shown by arrow 132 of FIG. 1), the distance between the distal end 407 of the internally threaded telescopic element 406 and the distal end 411 of the externally threaded telescoping element 410 will decrease by a distance "D" corresponding to the thread pitch times the number of revolutions of element 410. Similarly, upon counter-clockwise rotation of the externally threaded element 410, this distance will increase by a distance "D" per rotation of element 410. As also shown in FIG. 4, the adjustment mechanism 400 further comprises a plurality of externally threaded telescoping elements 408 which engage respective internally threaded telescoping elements 404 positioned on the various lane guide support projections 122. In the illustrated embodiment, upon rotation of the externally threaded telescoping elements 408 with respect to the irrotationally mounted internally threaded elements 404 in a clockwise direction (as shown by arrow 132 in FIG. 1), the distance between the distal end 409 of the externally threaded elements 408 and the distal end 405 of the internally threaded telescoping elements 404 will increase by a distance "d" for each revolution of element 410 corresponding to the pitch distance of the threading of the elements 408, 404. Typically, the distance "d" will be in the range of from about 0.06" to about 1" for lane guide apparatus intended for packaging of consumer-sized containers. Because the "handedness" of the screw thread of the element 406 is opposite that of the elements 404, the axial distance D of travel for each rotation of the element 410 within the element 406 will correspond to the negative sum of the one-rotation distances "d" of the finer-threaded elements 404, 408. Typically, the elements 404, 408 will provide a range of extension adjustment of from about the length of the elements 404, to at least about 1.5 times, and more preferably at least 1.75 times the length of the elements 404. Accordingly, in the illustrated embodiment 10 in which there are four sets of fine-threaded telescoping elements 404, 408, the elements 406, 410 will provide a total range of extension adjustment of four times the range of adjustment of each element 404, 408.

Figure 5:
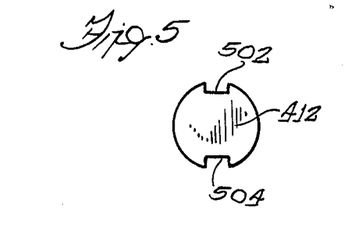
FIG. 5 is a cross sectional view of the channeled drive shaft of the apparatus of FIG. 2 taken along line 5—5 of FIG. 4.
Figure 6:
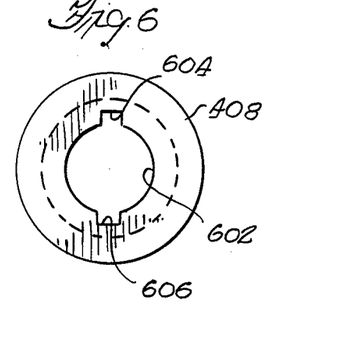
FIG. 6 is a cross sectional view of one of the threaded sleeve couplings of the apparatus of FIG. 2 taken along line 5—5 of FIG. 4.

The externally threaded telescoping elements 408 and 410 are irrotationally mounted on, for example, a keyed or splined shaft 412 such that they are free to slide rectilinearly along the axis of shaft 412, but are maintained in constant relationship to the rotational position of the shaft 412 so that they may be rotationally driven by the shaft. In this regard, FIG. 5 is a cross sectional view of the channel drive shaft 412 of the apparatus of FIG. 2 taken along line 5—5 of FIG. 4, and FIG. 6 is a cross sectional view of one of the internally threaded elements 404 similarly taken along line 5—5 of FIG. 4. As shown in FIG. 5, the slotted shaft 412, which may be of a suitable material, such as stainless steel, may be substantially circular in cross section, with the exception of one or more key slots 502, 504 or a spline which extend axially along the length of the shaft 412. The bore 602 is provided with two rectangular recesses 604, 606 positionally corresponding to the recesses 502, 504 of the driving shaft 412. Upon assembly of the externally threaded elements 408, 410 on the driving shaft 412 and appropriate alignment of the rotational positions in respect thereto, a rectangular passageway is provided by the aligned recesses 502, 604, 504, 606, into which are respectively inserted cross-sectionally rectangular key elements which prevent the rotation of the externally threaded rotationally telescoping elements 408, 410 in respect to the shaft 412, but which permit axial movement of these elements 408, 410, along the shaft 412. Of course, other methods for irrotational rectilinear engagement, such as a polygonal (e.g., triangular, square or hexagonal) shaft and corresponding spline shafts with mating bores are particularly preferred means for providing irrotational rectilinear engagement between shaft and the externally threaded elements.

Similarly, as shown in FIG. 6, the externally threaded telescoping elements 408 are provided with a substantially cylindrical bore 602 of circular cross section having a diameter only sufficiently larger than the external diameter of the shaft 412 to permit axial movement of the externally threaded elements along the shaft.

Figure 7:
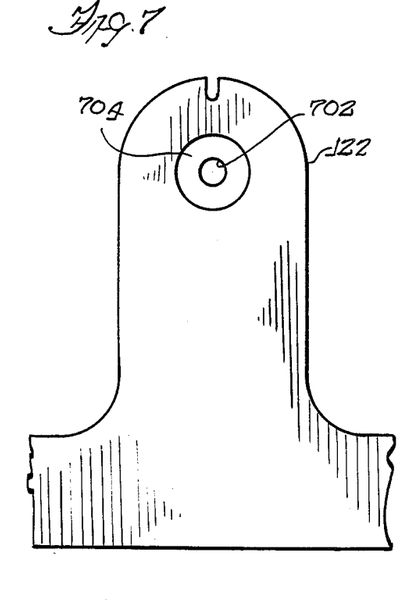
FIG. 7 is a side elevation of one of the lane guide plates of the apparatus of FIG. 1.

As previously discussed, the distal ends of the respective externally threaded telescoping elements 408, 410 abut and provide support for and adjust the position of the support projections 122 of the various lane guide elements 110, 112, 114, 116. In this regard, illustrated in FIG. 7 is a side elevation of one of the lane guide support projections 122 of the apparatus of FIG. 1. As illustrated in FIG. 7, the support projection of the lane guide has a cylindrical passageway 702 having a diameter only slightly larger than the external diameter of the drive shaft 412.

The surface of the lane guide support projection 122 immediately surrounding the cylindrical bore 702 is provided with a substantially flat bearing surface 704 having a diameter at least equal to the external diameter of the distal end of the externally threaded telescoping element 408 or 410 which the respective surface 704 is intended to abut. The distal ends of the respective externally threaded telescoping elements 408, 410 are desirably maintained in compression against the bearing surfaces 704. The bearing surfaces may comprise a suitable thrust bearing or thrust washer alone, or in combination with a thin, wave washer which is resiliently flattened upon compression, and positioned intermediate the distal ends of the telescoping elements 408, 410 and the bearing surfaces 704 for this purpose.

Figure 8:
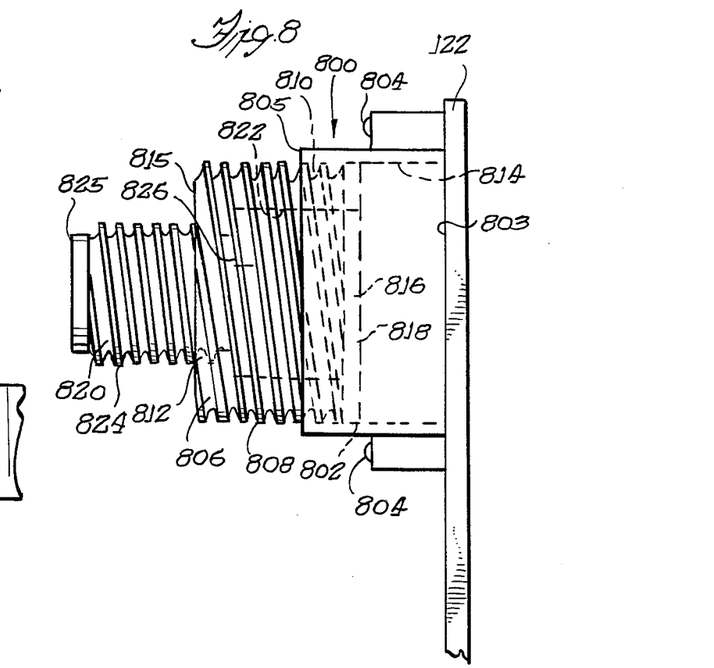
FIG. 8 is a side elevation, illustrated in phantom, of another embodiment of a telescoping adjustable guide assembly which may be used in the system of FIG. 1.

While in the illustrated embodiment 400, the threaded telescoping assemblies comprise a single externally threaded element and a single internally threaded element, various other threaded assemblies may also be utilized. In this regard, for example, another embodiment of a multi-element telescoping lane adjustment mechanism 800 is illustrated in FIG. 8 which provides an extended length of twice its axial length in closed position, for an extension ratio of over two. The embodiment 800 illustrated in FIG. 8 comprises an internally threaded telescoping element 802 which is affixed to a lane guide support projection 122 at its proximal end 803 by means of screws 804. An intermediate telescoping element 806 is provided with external threads 808 which engage the internal threads 810 of the fixed element 802, as well as internal threads 812. As shown in FIG. 8, the internal threads 810 of the fixed telescoping element 802 are located only at the distal end 805 of the fixed telescoping element 802, with a cylindrical, axially concentric bore 814 being provided which extends into the element 802 from its proximal end 803 and having a diameter greater than the external diameter of the threads 808 of the intermediate telescoping element 806. As also shown in FIG. 8, the threads 808 of the intermediate element 806 extend from the distal end 815 of the intermediate element 806 to a cylindrical, axially symmetric zone 816 at the proximal end 818 of the intermediate telescoping element 806. The zone 816 accordingly limits the axial travel of the intermediate element 806 within the proximal fixed element 802, to the depth defined by the cylindrical bore 814. Upon counter-clockwise rotation to closure, the element 806 could abut the proximal side 803 of the support projection 122 of the lane guide plate or an internal abutment, while rotational extension of the element 806 when rotated in the opposite direction will be prevented when unthreaded flange stop zone 816 reaches the proximate end of the threaded element 810 of the fixed telescoping element 802. The multi-element lane guide adjustment system 800 further includes an externally threaded element 820 having threads which engage the internal threads 812 of the intermediate telescoping element 806. Like the element 802, the intermediate element 806 is provided with a cylindrical bore 822 having a diameter slightly greater than the external diameter of the threads 824 of the element 820 which extends from the proximal end 818 of the intermediate element 806 to the threaded zone 812 at the distal end of the sleeve 806. Like the intermediate element, the freedom of axial travel of the externally threaded element 820 is limited by the depth of the cylindrical bore 822. Upon rotation in a counter-clockwise direction, the end stopping zone 826 of the externally threaded element 820 will abut the support projection 122 of the lane guide. The support bearing 825 at the distal end of the externally threaded element 820 has a diameter slightly greater than the external diameter of the threads 824. Accordingly upon closure of the multi-element assembly 800, the proximal surface of the support bearing 824 may contact the distal end 815 of the intermediate bushing element 806 to drive the rotational closure of the intermediate bushing upon continuous rotation of the shaft 412.

While the apparatus of FIG. 1 may be utilized to provide adjustment in a single dimension for linear transport of articles, various aspects of the invention may be employed to provide similar adjustment in multiple dimensions for article transport systems such as adjustable grid packing apparatus. Such adjustable grid packing systems may utilize generally orthogonal arrays of adjustable lane guide apparatus to accommodate a range of product sizes.

Various embodiments of such adjustable grid packing systems will comprise an upper adjustable lane guide assembly comprising a plurality of upper layer lane guides. Such a lane guide assembly desirably will comprise, or be an extension of, an adjustable, conveying lane guide system of the type previously described with respect to FIGS. 1–7. In this regard, the adjustable lane guide assembly will further comprise upper lane guide rotational adjustment and support means for supporting the upper layer lane guides at a predetermined separation distance determined by the rotational position of at least one threaded, axially telescoping adjustment mechanism separating and supporting the upper layer lane guides. The grid packing apparatus may further comprise a lower, bidirectionally adjustable lane grid assembly comprising a first plurality of lower lane grid elements parallel to and aligned with the upper layer lane guides and a second plurality of lane guide grid elements oriented generally orthogonally to the first plurality of lane guide grid elements. The lane grid assembly will further comprise first lane grid rotational adjustment and support means for supporting the first plurality of lane grid elements at a predetermined separation distance determined by the rotational position of at least one threaded, axially telescoping adjustment element separating and supporting the first plurality of lane grid elements and second lane grid rotational adjustment and support means for supporting the second plurality of lane grid elements at a predetermined separation distance determined by the rotational position of at least one threaded, axially telescoping adjustment mechanism separating and supporting the second plurality of lane grid elements. The adjustable grid packing apparatus may further comprise an adjustable, shifting support array of support elements positioned intermediate to the upper lane guide assembly and the lower grid assembly for supporting articles between the upper layer lane guide elements. A plurality of article guide means will desirably be provided, positioned at the zones of intersection of the first plurality of lower lane grid elements, and the second plurality of lane grid elements for guiding an article through openings defined by the first and second plurality of lane grid elements. Each article guide means will desirably be rectilinearly mobile along one of the first plurality of grid elements and one of the second plurality of grid elements, positioned at their zone of intersection, or which may be varied by relative motion of the respective grid elements. The adjustable support array may further comprise shifting support rotational adjustment and support means for supporting the support elements at a predetermined separation distance determined by the rotational position of at least one threaded, axially telescoping adjustment element separating and supporting the support elements. The grid packing apparatus desirably further comprises means for shifting the adjustable support array with respect to the upper lane guide array to remove support for articles positioned between the upper lane guide elements. The grid shifting means will preferably shift the support array with respect to the upper lane guide assembly and the lower lane guide assembly, but such means may also shift the latter component with respect to the support array.

Illustrated in FIGS. 9–12 is one embodiment of adjustable shifting grid packing apparatus 900 which is adapted to accept products delivered to the packer by the adjustable lane guide transport apparatus 10 of FIGS. 1–7. The downstream end of the continuously operated infeed conveyor 106, is located in closely spaced relationship to the adjustable packer 900 such that the articles 104 of uniform shape and size are transported between adjustable lane guides 108, 110, 112, 114, 116 as previously described, supported from the frame 902 of the adjustable packer 900. The illustrated grid packer 900 comprises an upper adjustable lane guide assembly 904 comprises continuous extensions of the lane guides 108–116. A lower, bidirectionally adjustable lane grid assembly 906 (FIG. 10), which may be fabricated of a suitable material such as stainless steel, provides guidance for the array of articles during transport into the respective individual cells of the product packages. Above the bidirectional array 906 is an adjustable shifting support array 908, which also may be of stainless steel, which is aligned parallel to the upper lane guide assembly 904.

The adjustable grid assembly 906 comprises two orthogonally oriented guide assemblies which have pocket defining corner posts 920 positioned at each intersection of the grid elements. The central body of the corner posts 920 may be fabricated of a highly rigid, low friction material such as a polyacetal polymer (e.g., Delrin polyacetal from DuPont) with appropriate slots 916, 918 for rectilinear engagement with the orthogonal components of the bidirectional array 906. The lower ends of these corner posts 920 are provided with inwardly projecting resilient members 922 which function to guide and control the downward movement of articles to be packaged through openings defined by the adjustable grid packer elements 904, 906, 908 into cells in a packing case for the articles. In operation, the articles to be packaged are supported on skid bars 930 of the shifting support array 908 for entry into the lane guide array 904 of the grid packer 900. When the shifting grid frame is moved (FIGS. 11 and 12) by a suitable mechanism such as pneumatic cylinder (not shown) driven shifting frame 914 activated under microprocessor control in accordance with conventional practice, the shifting support array 908 will move into alignment with the upper lane guides 904, such that the articles 104 are free to drop downwardly through the openings between the pocket defining corner posts 920 into a packing case.

Figure 9:
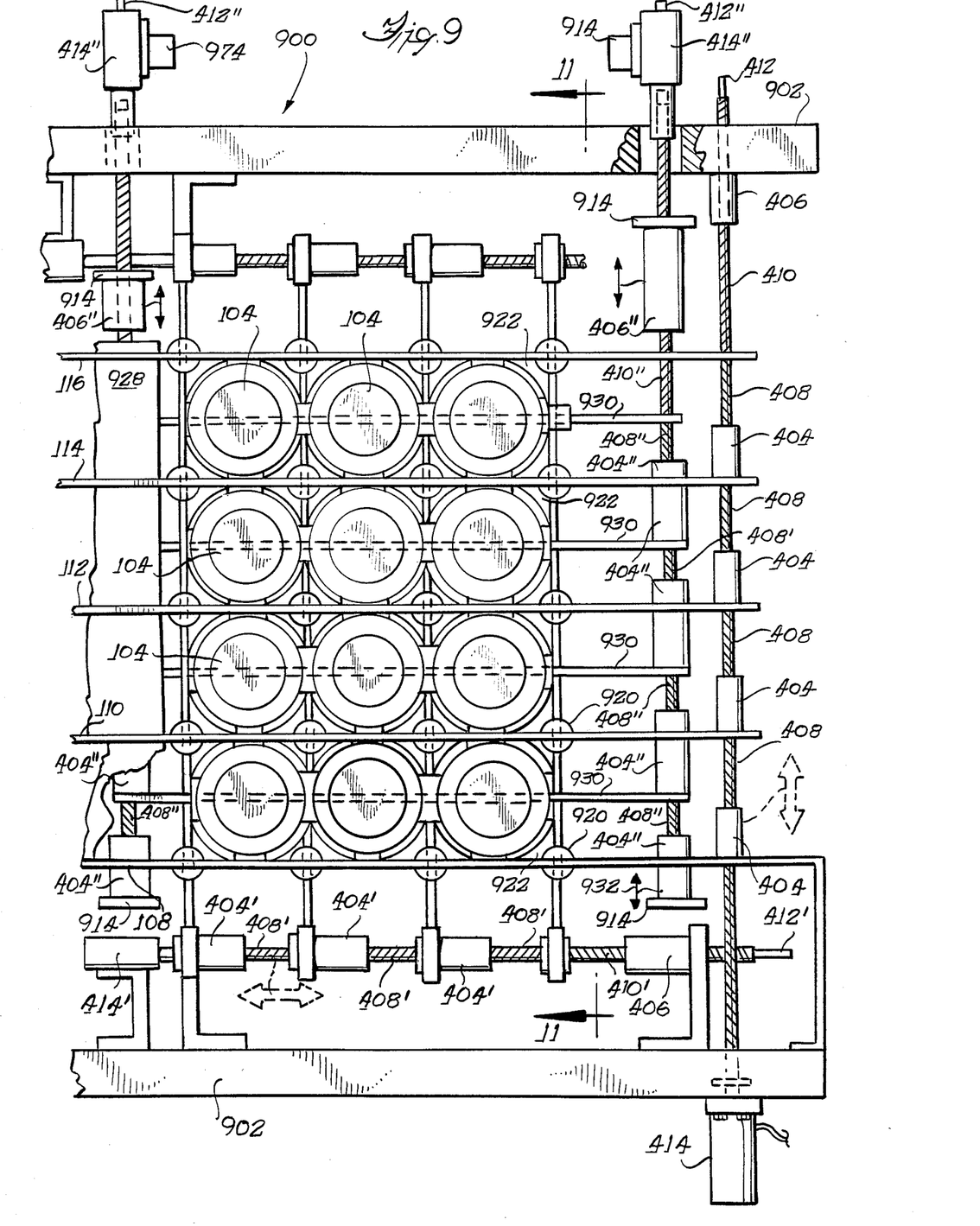
FIG. 9 is a top plan view of an embodiment of an adjustable, two-dimensional shifting grid packer which may be readily adjusted to accommodate the packaging of products of varying size.

In accordance with conventional practice, conventional lane detectors (not shown) are arranged in each of the columns defined by the lane guide array 904 to provide a signal when the grid frame is loaded with articles. In operation of the apparatus 900, the articles 104 are introduced between lane guide elements 108, 110, 112, 114 and 116 by means of the motion of conveyor 106 to ride along the skid bar elements 930 of shifting support assembly 908 until the articles reach a stationary stop element 924, which are mounted to the lane guide elements as shown in FIG. 9. The stop elements 924 may be readily adjusted to the desired position for a particular container configuration. While the articles 104 to be packaged are being loaded into the grid packer assembly 900, the skid bars 930 of the shifting support array 908 are positioned intermediate the lane guide elements such that they will support the product being transported into the packer assembly. In this regard, the upper surface of the skid bars 930 is substantially parallel to the upper surface of the conveyor 106. A dead plate 928, the upper surface of which is substantially parallel to the upper surfaces of the conveyor 106 and the skid bars 930, is positioned between the conveyor and the skid bars to facilitate the transfer of articles 104 thereover. When the grid packing array 900 is fully loaded with articles 104 to be packaged, they are positioned in a rectilinearly symmetrical array as shown in FIG. 9. When the conventional lane detector sensing elements (not shown) at the stationary stop members 924 signal the microprocessor that the grid packing array has been filled, a packaging cycle is activated. A conventional product clamp apparatus (not shown) descends upon the incoming array of articles 104 to clamp the units against the dead plate 928 to prevent entry into the grid packer and interference with the subsequent packaging operation. Upon clamping the incoming product stream, a shift cycle is initiated in the positioning of the adjustable shifting support array 908. In this regard, as previously described, the entire array 908 is mounted on a movable frame 914, which is movable (as shown by arrow 932) in a direction orthogonal to the direction of bottle travel within the packing array 900. The frame 914 may be shifted by an appropriate mechanism such as a pneumatic mechanism under microprocessor control, in accordance with conventional practice.

Figure 11:
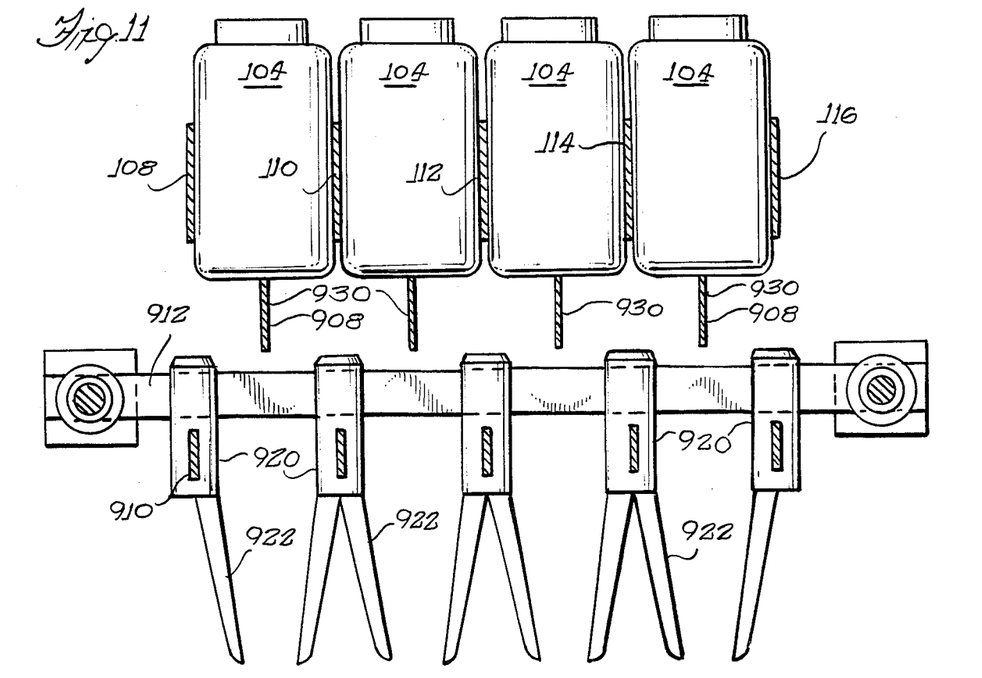
FIG. 11 is a vertical sectional view taken along line 11—11 of FIG. 9 illustrating the packer lane width and lane support adjustment mechanisms, and further illustrating the support grid and product positioning at a portion of the packaging cycle prior to product deposit into a multi-celled product carton.
Figure 12:
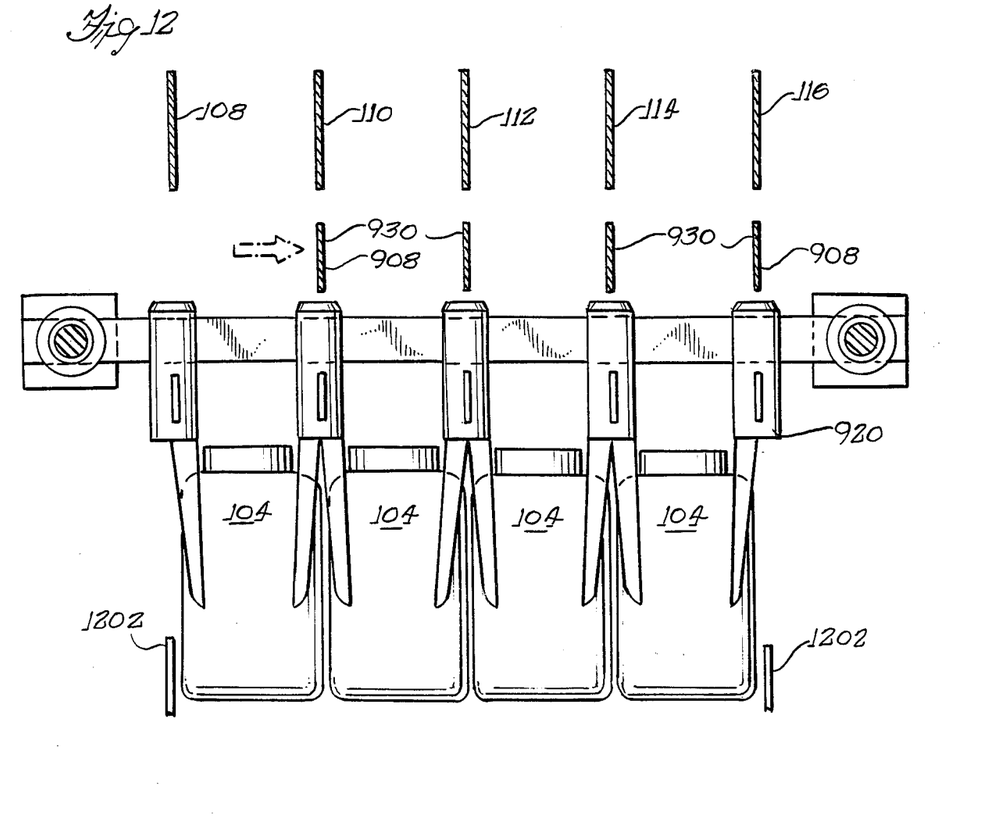
FIG. 12 is a vertical sectional view taken along line 12—12 of FIG. 9, like that of FIG. 11 illustrating the support grid and product positioning at a portion of the packaging cycle immediately after deposit of the product array into a multi-celled product carton.

The frame 914 is advanced a distance sufficient to cause alignment of the skid bars 930 with both the lane guide elements 108-116, and the parallel grid bar elements 910 of the bidirectional grid array 906. By removing the support previously provided by the skid bars 930, the articles 104 are permitted to drop through the openings defined by the parallel grid bars 910, perpendicular grid bars 912 and pocket defining corner posts 920 of the bidirectional grid array 906. FIG. 11 is a cross sectional view, partially broken away, taken through line 11—11 of FIG. 9, of the packer 900 at a time immediately prior to shifting of the skid bars 930. FIG. 12 is a similar cross sectional view, taken at a time after shifting of the skid bars to permit deposit of the articles 104 into a carton 1202 positioned beneath the packer 900. Upon passage of the product 104 through the openings, the product may be guided by the resilient projections 922 into the appropriate respective cells of the product container. Following deposit of the articles into the product package, the full case may be discharged, and an empty case is positioned under the grid packing assembly 900 in alignment with the bidirectional grid array 906.

After passage of the articles through the openings in the adjustable bidirectional grid array 906, the frame 914 of the shifting support array is returned to its original, support position so that the skid bars 930 are positioned to support incoming articles in the array. The article stop mechanism may then be retracted to release the articles 104 at the dead plate 928 so that a subsequent array of articles 104 may enter the grid assembly for a repeat of the packaging cycle.

Figure 10:
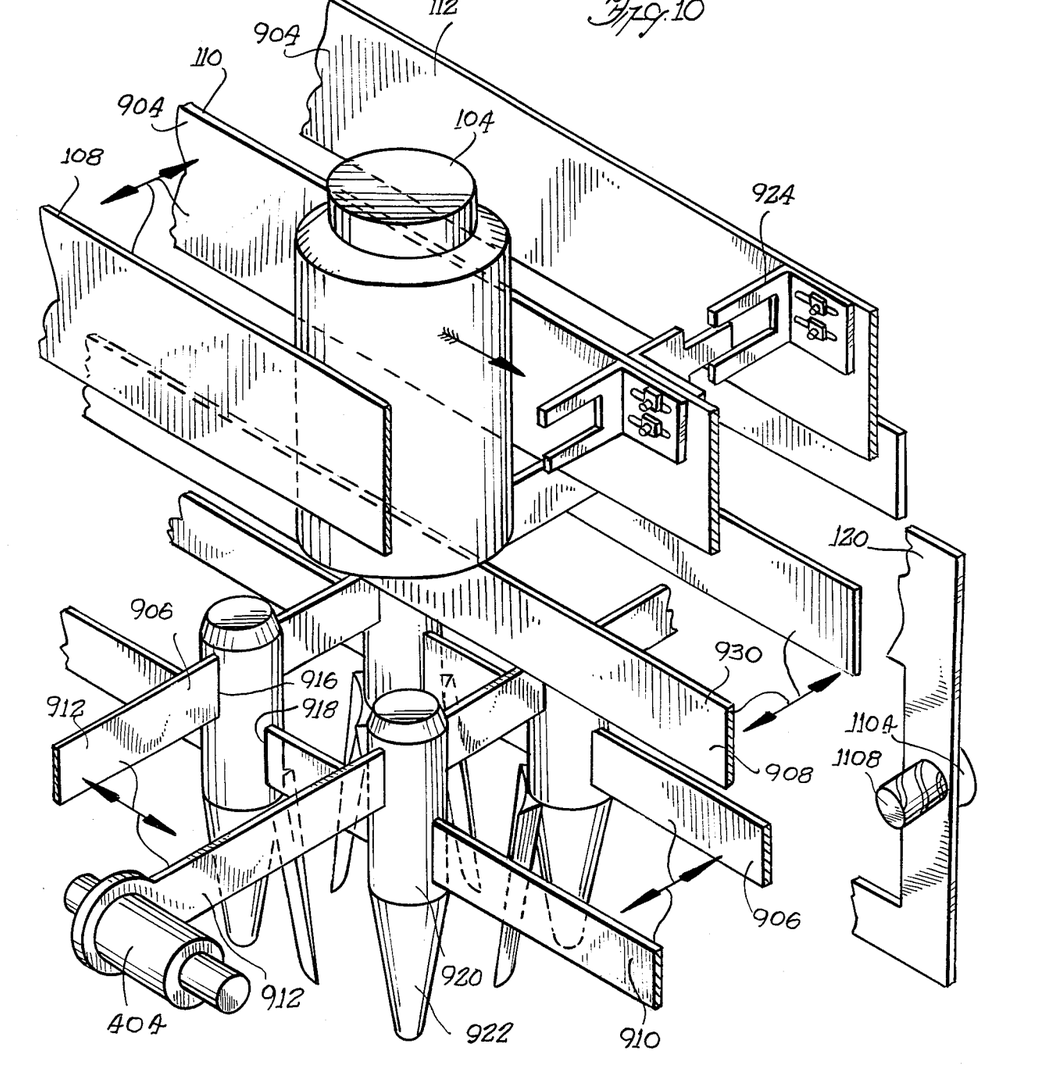
FIG. 10 is a perspective view, partially broken away, of a portion of the adjustable two dimensional shifting grid packer of FIG. 9 illustrating the product movement and the mobile grid elements of the grid packer embodiment.

As shown in FIG. 9, the grid packing assembly 900 is adjusted to package articles 104 of cylindrical cross section of predetermined dimension. If it is desired to use the grid packer 900 to package articles of different shape, such as cylindrical articles of different diameter, articles of oblong cross sectional dimension, or varying additional shapes, the grid assembly may be readily adjusted to accommodate the packaging of such articles. In order to adjust the grid packing apparatus 900, the lane guide elements 108-116 will be adjusted in the same manner as previously described in respect to the lane guide apparatus 10. In this regard, the terminating adjustment assembly elements 404, 408, 410 and 406 will be operated in conjunction with similar, correspondingly numbered elements positioned along the lane guide assembly under microprocessor control as previously described. For reasons of mechanical efficiency, the parallel grid bar elements 910 are respectively attached to the corresponding lane guide elements 108-116 at the terminating end of the grid packing array 900 (as best shown in FIG. 10), and are accordingly simultaneously adjusted to the desired lane width by operation of the elements 404, 406, 408, 410, 412 upon actuation of motor 414.

The upstream end of the parallel grid bar elements are similarly adjusted to the desired width dimension (corresponding to the width dimension of the openings in the bidirectional grid array 906 by means of a substantially identical width adjusting assembly (not shown) which functions in a parallel manner.

The longitudinal dimension of the bidirectional grid array 906 may be independently adjusted in a similar manner by means of a length adjustment assembly 404', 406', 408', 410', 412', 414', positioned at each respective end of the bidirectional grid array 906.

The pocket defining corner posts 920 are an important part of the bidirectionally adjustable grid array 906, and function to unify the bidirectionally adjustable grid array 906 and provide structural support for the array 906. The posts further define the corner positions of the openings defined by the adjustable grid array and serve to support resilient product guide elements 922 which aid in the direction of the product into the desired respective product cell of the product package. The perpendicular grid bar openings 916 permit rectilinear sliding passage of the perpendicular grid bars 912 through the corner posts elements 920 upon adjustment of the width of the bidirectional adjustable array 906. In this regard, it will be appreciated that upon adjustment of the spacing between the parallel grid bar elements 910, this adjustment will force adjustment of the width between the corner post elements 920, which spacing adjustment is accommodated by the freedom of the corner post elements 920 to travel only in a direction parallel to the perpendicular grid bars 912 which is permitted by the perpendicular grid bar openings 916.

The posts further define the corner positions of the openings defined by the adjustable grid array and serve to support resilient product guide elements 922 which aid in the direction of the product into the desired respective product cell of the product package. The parallel grid bar openings 918 permit rectilinear sliding passage of the parallel grid bars 910 through the corner posts elements 920 upon adjustment of the length of the bidirectional adjustable array 906. In this regard, it will be appreciated that upon adjustment of the spacing between the perpendicular grid bar elements 912, this adjustment will force adjustment of the length spacing between the corner post elements 920, which spacing adjustment is accommodated by the freedom of the corner post elements 920 to travel only in a direction parallel to the parallel grid bars 912 which is permitted by the parallel grid bar openings 918. The parallel and perpendicular grid bars 910, 912 as well as the skid bars 930 and other structural components of the apparatus 900 may desirably be constructed of stainless steel, although other materials may also be utilized. The corner posts 920 will desirably be constructed of a low friction organopolymeric material such as polyoxymethylene or polytetrafluoroethylene.

It will also be appreciated that the spacing between the skid bar support elements 930 must similarly be adjusted to accommodate any adjustment of the width between the lane guides 108–116. In addition, it will be appreciated that it may be desirable to adjust the support position independently of the adjustment of the spacing between the lane guide elements in order to maximize product support for different product types or configurations or machine efficiency or operation. In this regard, the skid bars 930 will be adjusted at their downstream end by means of a width adjustment mechanism 404", 406", 408", 410", 412", 414" as shown in FIG. 9 which is attached to the shifting grid support frame 914. A similar width adjusting assembly is positioned at the upstream end of the grid bar assembly, and is similarly affixed to the shifting grid support frame 914. The drive motors 414' may be positioned on the shifting frame 914, and/or may drive the shaft 412' in sliding engagement therewith. It is noted that in the embodiment 900, the shifting grid element width adjusting mechanisms at the respective ends of the skid bars 930 are positioned intermediate the width adjusting elements for the lane guides 108–116 and the parallel grid bar components 910 in order that the latter components may be adjusted by a single adjustment mechanism at the downstream end of the apparatus 900.

As indicated previously, all of the respective positions of the grid packer components 904, 906, 908 for a particular product may be rapidly adjusted under computer control, permitting great flexibility in packaging line utilization.

It will be appreciated that article transport systems such as lane guide and grid packing systems are provided which are readily adjustable to accommodate products of different sizes.

While the present invention has been particularly described with respect to specific embodiments, it will be appreciated that various modifications and adaptations will be apparent from the present disclosure and are intended to be within the spirit and scope of the following claims.

What is claimed is:

1. Apparatus for controlling the transport of rows of moving articles which is adjustable to accommodate articles of different size, comprising
   conveyor means for supporting and conveying articles along a moving pathway,
   a plurality of lane guides defining product transport lanes along said moving pathway each having at least one support zone having a passageway, and a rotatable shaft positioned in the passageway of each of said lane guides,
   a plurality of stationary, internally threaded telescoping elements irrotatably positioned on the respective lane guides, and a plurality of externally threaded telescoping elements respectively rotatably engaged in each of said internally threaded telescoping elements to form respective telescoping assemblies separating adjacent lane guides, wherein said externally threaded telescoping elements are each irrotationally mounted on said rotatable shaft and are free to slide rectilinearly along the axis of said shaft so that they may be rotationally driven by said shaft,
   and means for rotating said rotatable shaft such that the distance between each of the lane guides may be simultaneously increased or decreased.

2. Adjustable lane guide apparatus in accordance with claim 1 wherein said apparatus comprises at least two stationary end guides, one of said stationary end guides being one of said lane guides, and one of said stationary end guides being a fixed end guide having a support zone having a passageway in said fixed end guide with said rotatable shaft positioned therein and further having irrotatably positioned thereon an internally threaded telescoping compression element with an externally threaded telescoping compression element engaged therein, wherein said externally threaded telescoping compression element is irrotationally mounted on said rotatable shaft and free to slide rectilinearly along the axis of said shaft so that it is rotationally driven in a direction opposite that of said telescoping assemblies of said lane guides corresponding to the sum of the increase or decrease in length of said telescoping assemblies to maintain compressive force on said lane guides in a direction along said rotatable shaft.

3. Adjustable lane guide apparatus in accordance with claim 2 wherein said apparatus has two stationary end supports, a central stationary guide, intermediate the two stationary end supports, with a plurality of said lane guides which are adjustable in position disposed intermediate said end guides and said central guides.

4. Adjustable lane guide apparatus in accordance with claim 1 wherein said lane guides are in parallel array, forming a plurality of product lanes therebetween to guide product transport and wherein the distance between the lane guides corresponding to the width of the product transport lanes is slightly larger than the preselected product width perpendicular to its desired direction of transport, and wherein the lane guides and product lanes defined therebetween may be linear or curved to effect the desired transport direction in the product transport flow.

5. Adjustable lane guide apparatus in accordance with claim 1 wherein one or two of said stationary telescoping elements are positioned on each respective lane guide at the respective support zone.

6. Apparatus in accordance with claim 5 wherein stationary telescoping elements are positioned on opposite sides of at least one of said guides.

7. Apparatus in accordance with claim 1 wherein each of said telescoping elements has approximately the same length to provide a range of extension adjustment of distance between said lane guides of from about the length of said telescoping elements to at least about 1.5 times the length of said telescoping elements.

8. Apparatus in accordance with claim 7 wherein said externally threaded elements are keyed or splined to said rotatable shaft.

9. Apparatus in accordance with claim 1 further comprising automated lane width adjustment means comprising a linear position control sensor means for sensing the position of at least one movable lane guide, mechanical positioner means responsive to a central controller for controlling the position of said means for rotating said shaft, programmable controller means for storing preselected lane width data for processing each of a respective plurality of different products for receiving position information from said position control sensor means, means for permitting operator selection of desired lane width data, and for controlling said mechanical positioner means so that the lane guide position determined by said linear control sensor means corresponds to the selected lane width selection.

10. Apparatus in accordance with claim 9 further including teaching pendant means for storing the position of the lane guides such that the selected position may be restored when desired under control of said logic controller.

* * * * *